United States Patent [19]
Wu

[11] Patent Number: 5,373,409
[45] Date of Patent: Dec. 13, 1994

[54] DISK FOR CLEANING MAGNETIC HEAD OF DISK DRIVE

[76] Inventor: Chun-Lung Wu, 12F, No. 193, Pa-Te 1st Rd., Hsin-Hsing Dist., Kaohsiung, Taiwan, Prov. of China

[21] Appl. No.: 36,250
[22] Filed: Mar. 24, 1993
[51] Int. Cl.⁵ .................. G11B 5/41; G11B 5/455
[52] U.S. Cl. .................................... 360/128
[58] Field of Search ............................ 360/128

[56] References Cited
FOREIGN PATENT DOCUMENTS

| | | | |
|---|---|---|---|
| 1-204209 | 8/1989 | Japan | 360/128 |
| 3-12810 | 1/1991 | Japan | 360/128 |
| 3-40208 | 2/1991 | Japan | 360/128 |
| 4-134712 | 5/1992 | Japan | 360/128 |
| WO91/02350 | 2/1991 | United Kingdom | 360/128 |

Primary Examiner—John H. Wolff
Attorney, Agent, or Firm—Larson and Taylor

[57] ABSTRACT

A disk for use in cleaning a magnetic head of disk drive comprises an inner ring of memory and an outer ring made of a tough and yet gentle material for use in removing impurities from the surface of the magnetic head. The disk is capable of doing an automatic inspection of the status of the cleaning process in accordance with a control program, and of sending out an instruction to trigger an automatic interruption of the cleaning process at such time when the job of cleaning the magnetic head is completed.

1 Claim, 3 Drawing Sheets

DISK FOR CLEANING MAGNETIC HEAD OF DISK DRIVE

FIELD OF THE INVENTION

The present invention relates to a magnetic head of a disk drive, and more particularly to a disk for use in cleaning the magnetic head of a disk drive.

BACKGROUND OF THE INVENTION

In general, the magnetic head of a disk drive is cleaned by means of a cleaning disk, which is made of a paper or fabric material and is capable of removing impurities, foreign matters, or undesirable elements from the magnetic head. However, such a conventional cleaning disk is devoid of a data-recording capability.

In the process of cleaning the magnetic head of a disk drive, the cleaning disk as described above is inserted into a disk drive before the disk drive is started. As soon as the disk drive is started, the cleaning disk begins turning so as to rub and pass over the magnetic head intended to be cleaned. However, in the course of cleaning the magnetic head, an operator of the computer has no way of telling for sure if the cleaning disk has done the job of cleaning the magnetic head. As a result, the operator has to rely on his or her instinct, experience and judgement to determine the timing of bringing the cleaning process to an end. This the prior art method of cleaning the magnetic head described above is rather primitive and unreliable. In order to mark sure that the magnetic head has been cleaned, the operator has to remove the cleaning disk from the disk drive into which a floppy disk is then inserted for testing the efficiency of the read-write function of the magnetic head. An affirmative test result indicates that the magnetic head in question has been successfully cleaned by the cleaning disk, and that the cleaning process can be terminated. On the other hand, a negative test result suggests that the magnetic head in question has not been successfully cleaned by the cleaning disk, and that the foregoing process of cleaning the magnetic head must be carried out repeatedly until such time when an affirmative test result is attained. It must be noted here that the cleaning process described above can be at times the source of a terrible nightmare to the computer operator who happens to have reached an erroneous conclusion that the magnetic head has not been cleaned successfully by the cleaning disk. As a result, the computer operator continues to carry out the cleaning process, thereby subjecting the magnetic head to damage caused by the excessive mechanical friction between the cleaning disk and the magnetic head which no longer has the impurities attached thereon to act as buffer.

SUMMARY OF THE INVENTION

It is therefore the objective of the present invention to provide a magnetic head cleaning disk with a memory capable of cooperating with an appropriate control program so as to streamline the implementation of the cleaning process of the magnetic head.

The foregoing objective of the present invention is accomplished by a cleaning disk, which is made jointly of a magnetic material and a material suitable for use as a safe cleaner of the magnetic head of disk drive, and which is covered with a protective jacket similar in structure and function to the one that is commonly used in an ordinary floppy disk. The cleaning disk of the present invention is characterized in that it is capable of doing an automatic inspection of the status of the cleaning process in accordance with a control program, and that it is capable of sending out an instruction to trigger an automatic interruption of the cleaning process at such time when the process of cleaning the magnetic head has been completed successfully. Therefore, the cleaning disk of the present invention has overcome all the drawbacks of the prior art cleaning disk described previously.

DETAILED DESCRIPTION OF THE INVENTION

Figure 1:
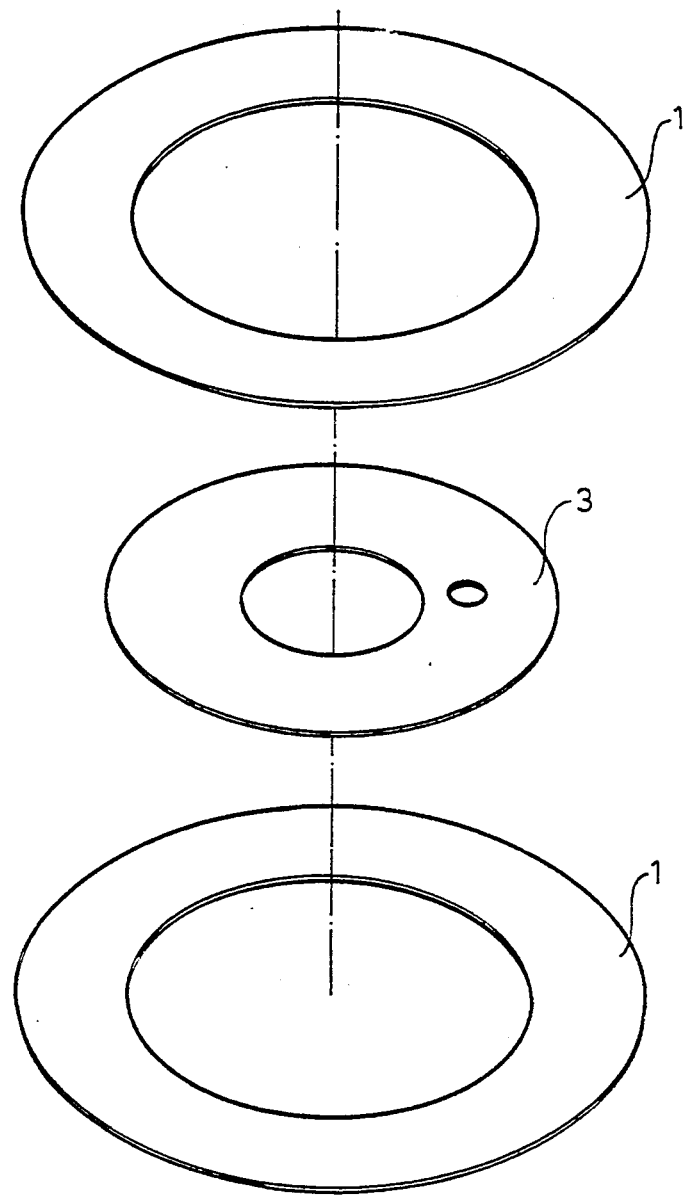
FIG. 1 shows an exploded view of a cleaning disk of the present invention.
Figure 2:
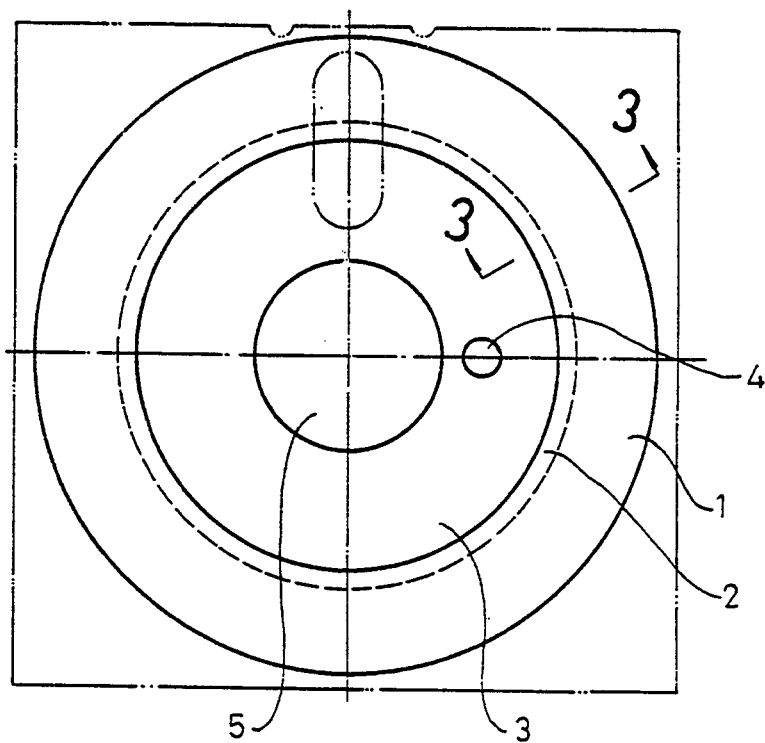
FIG. 2 shows a front view of the cleaning disk of the present invention.
Figure 3:
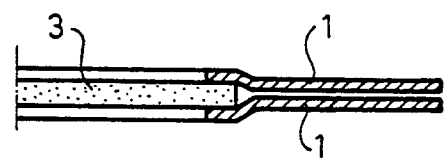
FIG. 3 is a sectional view of a portion taken along the line 3—3 as shown in FIG. 2, with a thickness in the vertical direction being magnified.

Referring to FIGS. 1-3, a cleaning disk of the present invention is shown to comprise a thin disk protected by a jacket of rectangular construction. The thin disk is provided at the center thereof with a spindle hole 5 to facilitate the turning of the disk in a disk drive. The disk is further provided with an index hole 4 adjacent to the spindle hole 5, so as to enable certain disk drives to find a magnetic area on which they can operate normally. The cleaning disk is composed of a memory 3 held between the two cleaning rings 1, as shown in FIG. 1. The memory 3 of high molecular material is similar in structure and construction to the memory of an ordinary computer disk and is coated with magnetic particles, a protective layer and a lubricating layer. The magnetic particles of the memory 3 can be magnetized by the magnetic field generated by a magnetic head, so as to be able to record information. Each of the two thin cleaning rings 1 is made of a water-containing material which is tough and yet gentle enough to cause no damage to a magnetic head when in contact with the magnetic head. In addition, the cleaning disk of the present invention comprises a laminating ring 2, which is an annular area formed by the lamination of the memory 3 and the cleaning rings 1. In operation, the magnetic head is not allowed to enter the laminating ring 2.

Figure 4:
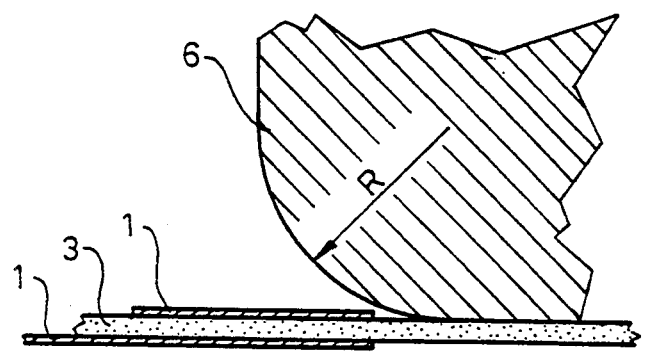
FIG. 4 shows a magnified schematic ring of the cleaning disk of the present invention.

Located at the juncture between the laminating ring 2 and the cleaning ring 1 is a raised section, which extends outwards from the disk center. Under the circumstance that the height of the raised section exceeds a certain limit, the movement of the magnetic head may be obstructed by the raised section. In order to enable the cleaning disk of the present invention to rotate smoothly in a disk drive, it is suggested that the cleaning disk of the present invention must be corresponding in thickness to an ordinary computer disk. In general, the ordinary magnetic disk has a thickness on the order of 80 microns. Accordingly, each of the two cleaning rings 1 should not be more than 40 microns in thickness. Therefore, the maximum height of the raised section is 40 microns. As shown in FIG. 4, a magnetic head 6 is provided with a chamfer or a roundness at the angle of rotation of a contact surface between the magnetic head 6 and the cleaning disk, so as to minimize the phenomenon of stress concentration, with the radius (R) of the roundness being at least over several hundred microns. As a result, the height of the raised section is such that it does not obstruct the movement of the magnetic head 6. The laminating ring 2 is thicker than any other area of the cleaning disk. However, the laminating ring 2 has a rather small width, which is sufficient to cause the cleaning rings 1 to adhere firmly to the memory 3. In other words, the width of the laminating ring 2 is such that it does not interfere with the turning of the cleaning disk. When the magnetic head 6 slides across the laminating ring 2, the magnetic head suspension mechanism of the disk drive is able to act to compensate for such a small variation of thickness, so as to minimize the impact of the laminating ring 2 on the normal operation of the disk drive.

Figure 5:
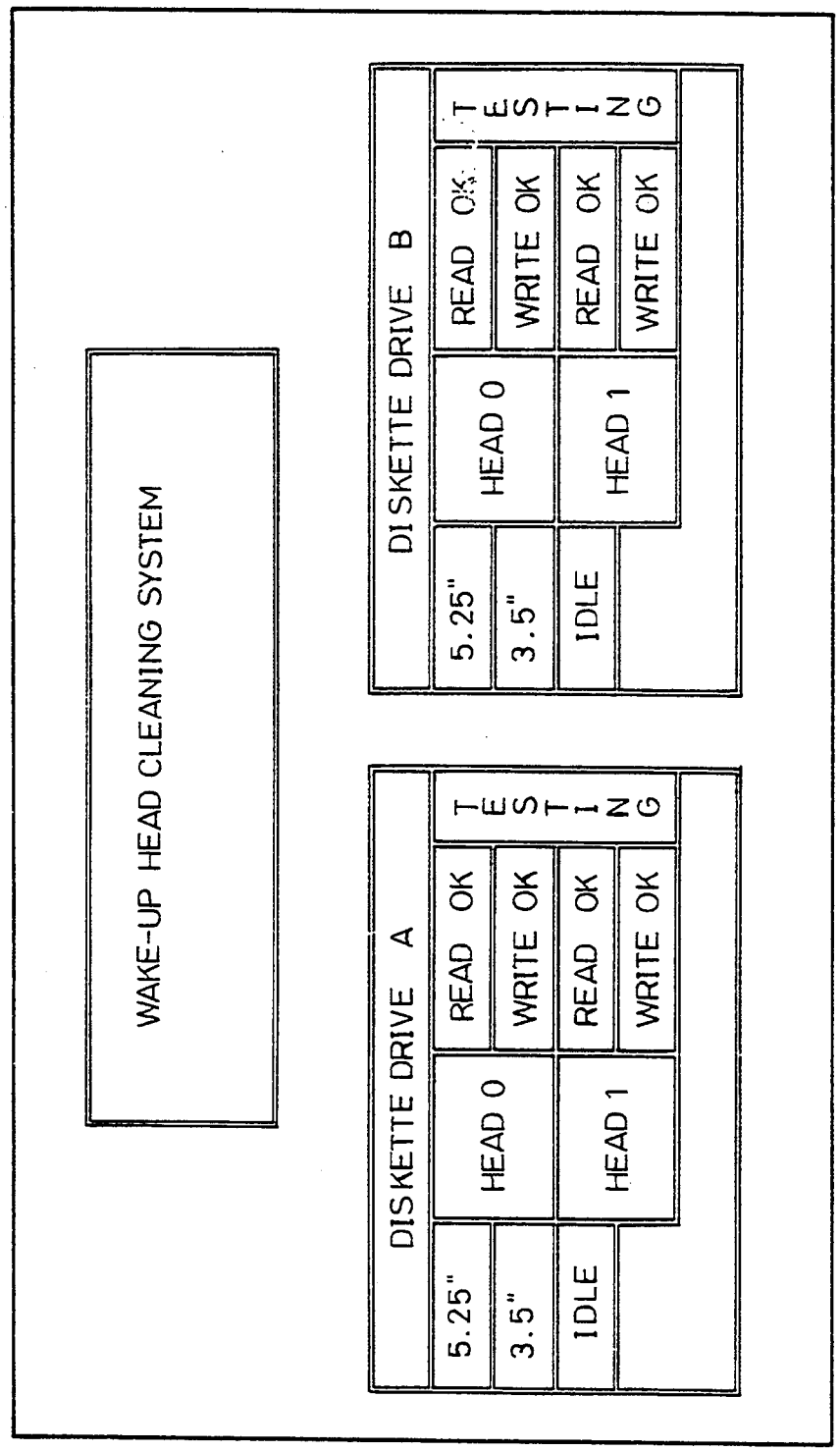
FIG. 5 shows a display of information on a video display of computer terminal at such time when the execution of the process of cleaning a magnetic head by the cleaning disk of the present invention is under way.

In operation, the cleaning disk of the present invention is first inserted into a disk drive before a command is entered to request for the control program through which the disk drive is started. As a result, the cleaning disk begins turning while a magnetic head intended to be cleaned is guided by the control program to begin rubbing the cleaning ring 1 along the radial direction of the cleaning ring 1 and within the range of the cleaning ring 1. Since the magnetic head is caused to move in a radial direction on the cleaning ring 1, the magnetic head can be therefore cleaned effectively by the cleaning ring 1. Shortly thereafter, the magnetic head is once again guided by the control program to move from the cleaning ring 1 to the memory 3 where the magnetic head is instructed to perform the read-write function using pre-stored data in the memory 3. If the read-write performance of the magnetic head is satisfactory, the process of cleaning the magnetic head can be terminated. If the read-write performance of the magnetic head is unsatisfactory, the process of cleaning the magnetic head is carried out repeatedly until such time when the magnetic head performs its read-write function in a normal and acceptable manner. The cleaning process described above is automatically executed by the control program even in the absence of a computer operator. Moreover, an instant status report on the progress of the cleaning process is made visually available on a video display of terminal, as shown in FIG. 5.

It must be noted here that the control program of the present invention must be stored by means of an auxiliary memory. Therefore, a clean magnetic head must be used to record the control program in the main memory from the auxiliary memory. Under a normal operating circumstance, a terminal should have at least one disk drive, either a hard disk drive or a floppy disk drive, which still operates normally and satisfactorily. As a result, the recording of the control program in the main memory from the auxiliary memory is technically feasible. Nevertheless, such recording of the control program in the main memory from the auxiliary memory may fail occasionally. With a view to preventing such a mishap from taking place, the present invention may be modified in such a manner that the cleaning rings 1 are arranged in the outer rings. Such a modification is called for on the grounds that the magnetic head is often moved to the outermost magnetic track at such time when the disk drive is rearranged, and that the operating system must first search the catalog area and the files distribution table, which are located on the outer magnetic tracks, when the operating system stores and retrieves data. When the control program of the present invention is unable to be put into operation, the operating system can be instructed to execute the operation of storing and retrieving the data even if the magnetic head is too dirty to read and write the date. As a result, the dirty magnetic head receives a rearrangement signal so as to move to the outer rings. In addition, the dirty magnetic head may also move to the outer rings in search of the catalog. Therefore, the rubbing action of the dirty magnetic head is brought about in the outer rings even though the control program of the present invention fails.

What is claimed is:

1. A disk apparatus for cleaning a magnetic head of a disk drive of a computer in response to a control program comprising:

a jacket of rectangular construction; and a thin disk enclosed by said jacket and having a spindle hole at a center thereof by which said disk is driven by the disk drive, said disk including an inner memory ring portion coated with magnetic particles and including pre-stored data to be read by the magnetic head, and an outer ring portion made of an impurity removing material which is used to clean the magnetic head, said outer ring extending over a position where an outermost magnetic track for a usual disk read by the disk drive is positioned.

wherein said outer ring portion is made of two separate outer rings, an inner edge of each of said outer rings overlapping an outer edge on a respective face of said inner ring portion to form a laminate by which said inner ring portion is held between said outer rings.

* * * * *